United States Patent
Nicholson et al.

(10) Patent No.: US 11,250,861 B2
(45) Date of Patent: Feb. 15, 2022

(54) AUDIO INPUT FILTERING BASED ON USER VERIFICATION

(71) Applicant: Lenovo (Singapore) Pte. Ltd., Singapore (SG)

(72) Inventors: John Weldon Nicholson, Cary, NC (US); Howard Locker, Cary, NC (US); Daryl Cromer, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 269 days.

(21) Appl. No.: 16/505,043

(22) Filed: Jul. 8, 2019

(65) Prior Publication Data

US 2021/0012780 A1 Jan. 14, 2021

(51) Int. Cl.
*G10L 17/22* (2013.01)
*G06F 3/16* (2006.01)
*G10L 17/06* (2013.01)
*G10L 17/04* (2013.01)
*G10L 17/00* (2013.01)

(52) U.S. Cl.
CPC .............. *G10L 17/22* (2013.01); *G06F 3/165* (2013.01); *G10L 17/00* (2013.01); *G10L 17/04* (2013.01); *G10L 17/06* (2013.01)

(58) Field of Classification Search
CPC ......... G10L 17/22; G10L 17/00; G10L 17/04; G10L 17/06; G10L 17/10; G10L 17/24; G10L 25/78; G10L 25/81; G10L 25/84; G10L 25/87; G10L 25/783; G10L 25/786; G06F 3/16; G06F 3/162; G06F 3/165; G06F 3/167; G06F 21/32; H04N 1/442; H04N 21/4415; H04L 29/06809; H04L 63/0861; H04L 9/0866; H04L 9/3231
See application file for complete search history.

(56) References Cited

U.S. PATENT DOCUMENTS

| | | | |
|---|---|---|---|
| 2006/0056662 A1* | 3/2006 | Thieme | G06K 9/685 382/115 |
| 2009/0253408 A1* | 10/2009 | Fitzgerald | H04M 1/72457 455/411 |
| 2010/0207721 A1* | 8/2010 | Nakajima | H04W 12/082 340/5.3 |
| 2011/0107415 A1* | 5/2011 | Shen | G06F 21/445 726/19 |
| 2012/0117633 A1* | 5/2012 | Chakra | H04L 9/3231 726/7 |
| 2012/0252411 A1* | 10/2012 | Johnsgard | G07C 9/37 455/411 |
| 2014/0128032 A1* | 5/2014 | Muthukumar | H04W 4/12 455/411 |
| 2018/0039990 A1* | 2/2018 | Lindemann | G06F 21/32 |
| 2018/0137267 A1* | 5/2018 | Krieger | H04N 21/44218 |

(Continued)

Primary Examiner — Andrew C Flanders
(74) Attorney, Agent, or Firm — Ference & Associates LLC

(57) ABSTRACT

One embodiment provides a method, including: detecting, using an audio capture device associated with an information handling device, audible input; determining, using a processor, whether the audible input is associated with an authorized user; and performing, responsive to determining that the audible input is not associated with the authorized user, a silencing action associated with the audio capture device. Other aspects are described and claimed.

16 Claims, 3 Drawing Sheets

(56) References Cited

U.S. PATENT DOCUMENTS

2019/0082047 A1* 3/2019 Abramson ........ H04M 1/72463
2019/0130082 A1* 5/2019 Alameh .................. G06F 21/32
2019/0130172 A1* 5/2019 Zhong ................ G06K 9/00268
2021/0168517 A1* 6/2021 Wexler ................ H04R 25/606

* cited by examiner

AUDIO INPUT FILTERING BASED ON USER VERIFICATION

BACKGROUND

Individuals frequently interact with their information handling devices ("devices"), for example, smart phones, tablet devices, laptop and/or personal computers, and the like using voice inputs. For example, voice input from an individual may be detected by an audio capture device (e.g., a microphone, etc.) and may thereafter be transmitted to one or more other individuals (e.g., in a conventional phone conversation, in a Voice over Internet Protocol (VoIP) call, etc.). As another example, individuals may provide vocal commands that may be utilized to control one or more functions of a particular application.

BRIEF SUMMARY

In summary, one aspect provides a method, comprising: detecting, using an audio capture device associated with an information handling device, audible input; determining, using a processor, whether the audible input is associated with an authorized user; and performing, responsive to determining that the audible input is not associated with the authorized user, a silencing action associated with the audio capture device.

Another aspect provides an information handling device, comprising: an audio capture device; a processor; a memory device that stores instructions executable by the processor to: detect audible input; determine whether the audible input is associated with an authorized user; and perform, responsive to determining that the audible input is not associated with the authorized user, a silencing action associated with the audio capture device.

A further aspect provides a product, comprising: a storage device that stores code, the code being executable by a processor and comprising: code that detects audible input via an audio capture device; code that determines whether the audible input is associated with an authorized user; and code that performs, responsive to determining that the audible input is not associated with the authorized user, a silencing action associated with the audio capture device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
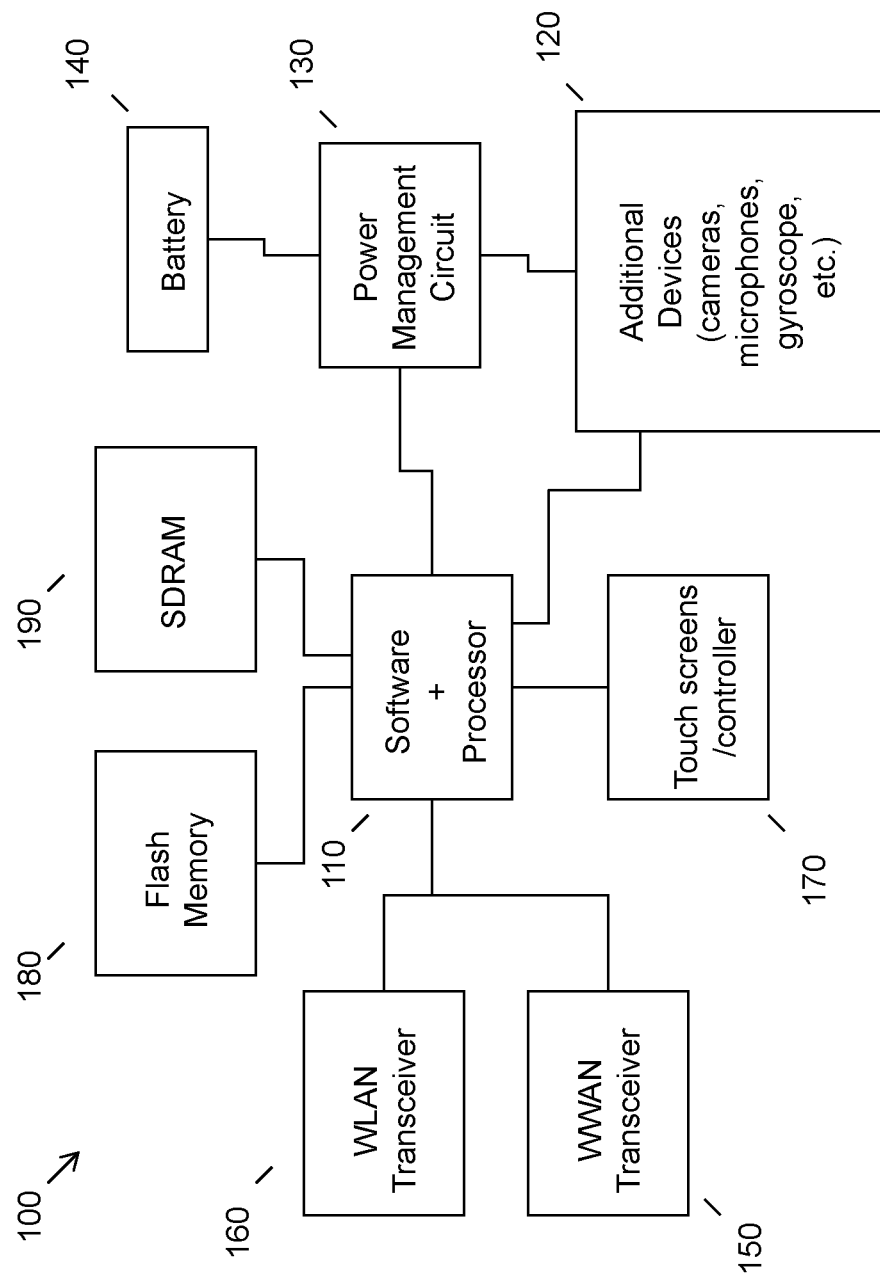
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The presence of background noise in a user's environment may interfere with the user's ability to provide clear and understandable voice input to a device. For example, many modern offices are transitioning to an open-style landscape in which workers are seated in close proximity to one another and/or are not separated by walled partitions. In these layouts, noise produced by other individuals may be easily captured by an audio capture device (e.g. a microphone, etc.) that a user is speaking into. Such a situation may affect the clarity of a conference call (e.g., a VoIP call, etc.) a user is engaged in. More particularly, the participants in the conference may hear the voices and/or sounds of other people and/or objects in the user's environment when the user is not speaking, which may be distracting.

Advances in technology have led to the development and popularization of beamforming microphones. Modern beamforming technology is capable of clearly capturing and reproducing human voices in conferencing applications, and rejecting unwanted sounds, to optimize collaboration and understanding among conference participants. However, many commonly used microphones (e.g., headset microphones, etc.) are not equipped with beamforming capabilities that are able to isolate the user from background noise. Additionally, the aforementioned microphones do not use a boom microphone with sensitivity conducive to a limited pickup range.

Accordingly, an embodiment provides a method for reducing the pickup of background noise in devices that do not utilize beamforming technology or other advanced noise filtering equipment. In an embodiment, a microphone may first detect audible input. An embodiment may then determine whether the audible input was provided by an authorized/recognized user. For example, an embodiment may compare the audible input to a voiceprint known to be associated with the authorized user to determine whether there is a predetermined level of similarity between the two sound signals. Responsive to determining that the audible input is not associated with the authorized user, an embodiment may perform a silencing action associated with the microphone. For example, an embodiment may prompt the authorized user to mute the microphone or, alternatively, automatically mute the microphone. Such a method may reduce the presence of background noise heard in conferencing situations.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
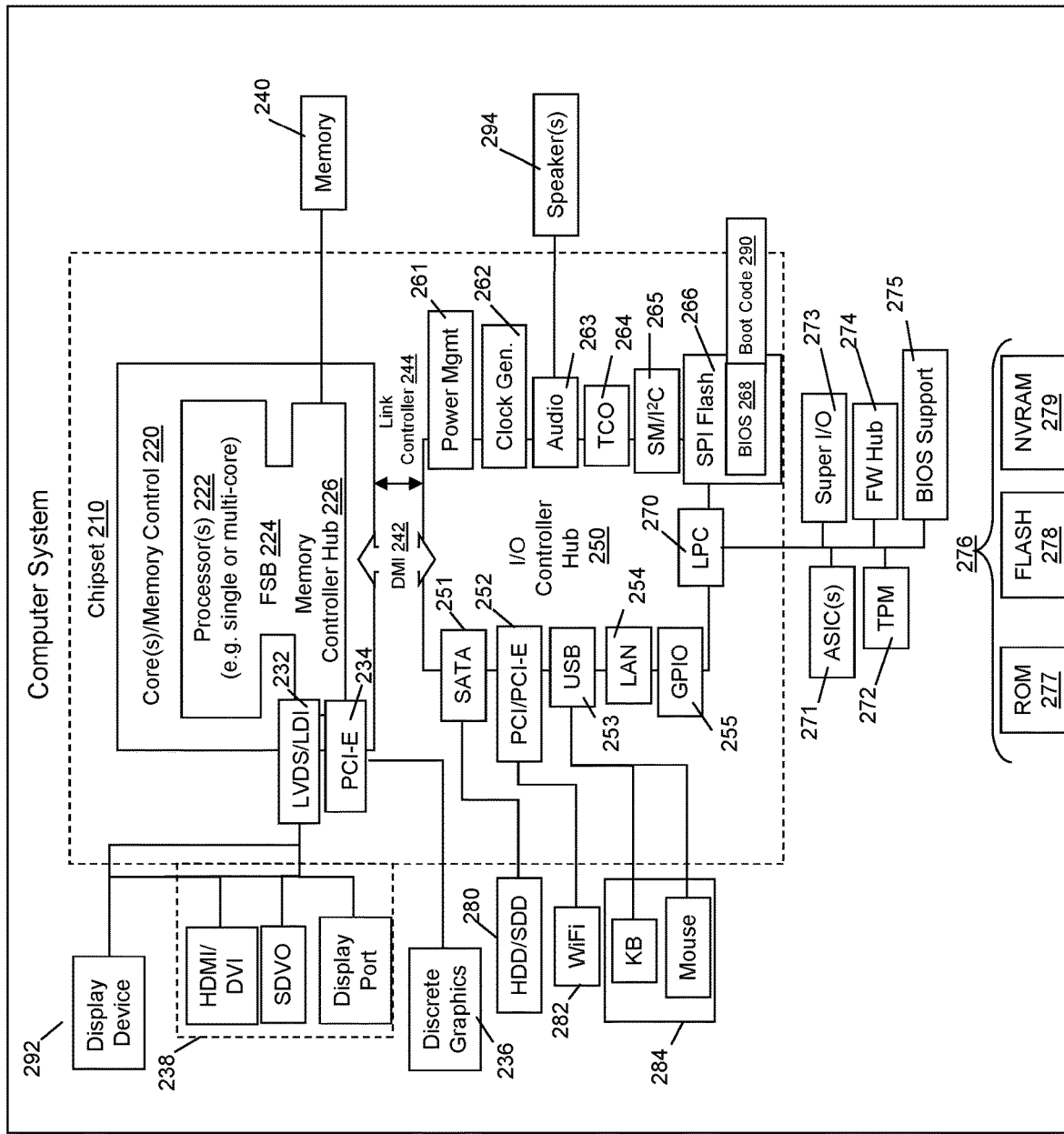
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart TVs, laptops, virtual or augmented, or mixed reality head mounted devices, and/or other electronic devices that may be able to support media streams or provide media output. For example, the circuitry outlined in FIG. 1 may be implemented in a tablet or smart phone embodiment, whereas the circuitry outlined in FIG. 2 may be implemented in a laptop.

Figure 3:
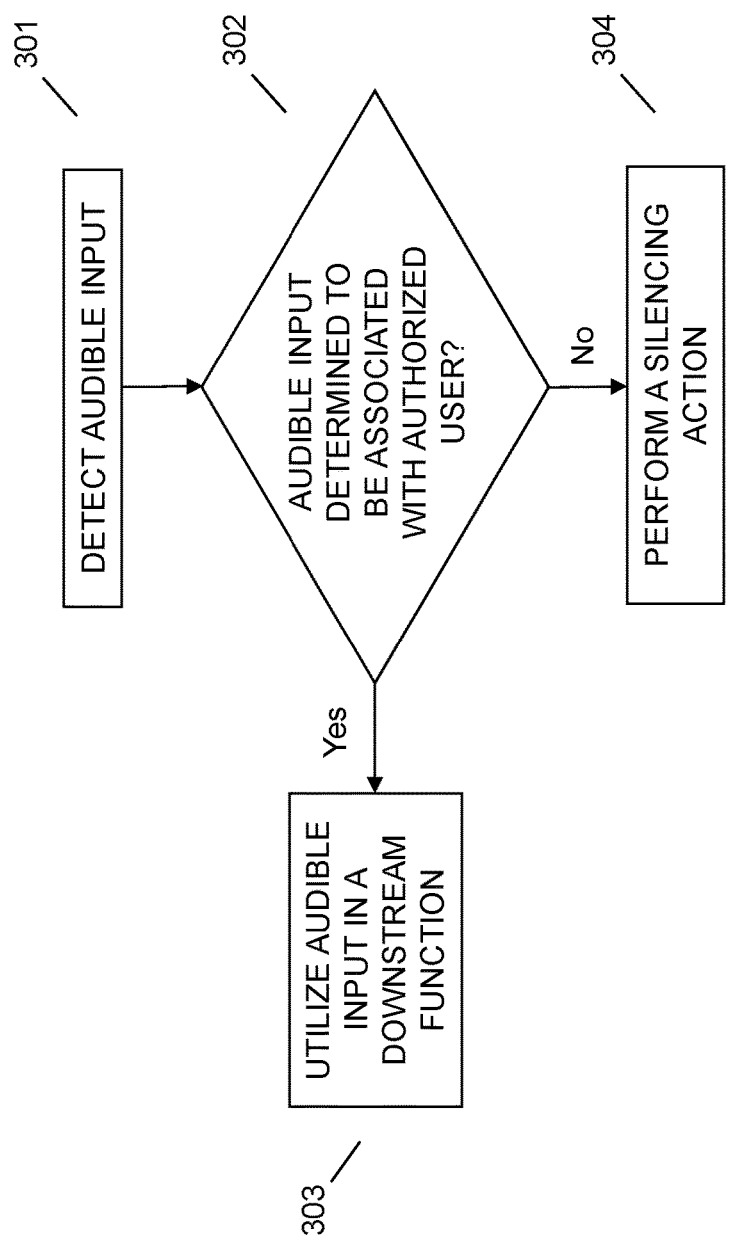
FIG. 3 illustrates an example method of reducing the presence of identified background noise.

Referring now to FIG. 3, an embodiment may reduce the presence of identified background noise. At 301, an embodiment may detect audible input. In an embodiment, the audible input may be detected by an audio capture device, such as a microphone, integrated or operatively coupled to a user's computer device. More particularly, the audio capture device may detect audio and transmit that audio to the user's device to be used in some downstream function.

At 302, an embodiment may determine whether the audible input is associated with an authorized user. In the context of this application, an authorized user may be an individual that is a registered, or frequent, user of a particular device. In an embodiment, the determination may be conducted using one or more of the following determination techniques.

For example, in an embodiment, the determination may be conducted by using one or more voiceprint identification techniques. More particularly, as a non-limiting example, an embodiment may access a database comprising, inter alia, a voiceprint associated with the authorized user and thereafter determine if the detected audible input shares a predetermined level of similarity with the authorized user's voiceprint (e.g., with respect to pitch, speech rate, loudness, a combination thereof, etc.). In an embodiment, the database may be stored on the user's device or, alternatively, may be stored at a remote storage location (e.g., on another device or server, in the cloud, etc.). Regarding the latter, if the database is stored at a remote storage location it may be accessible by one or more devices. In this situation, the database may be available to virtually any device associated with the user. Responsive to determining that the audible input is similar enough to the authorized user's voiceprint, an embodiment may conclude that the audible input is vocal input provided by the authorized user. Conversely, responsive to determining the audible input does not share a minimum threshold level of similarity with the voiceprint, an embodiment may conclude that the audible input is noise produced by another source (e.g., another individual, another object, etc.).

In an embodiment, the voiceprint associated with the authorized user may be trained during the natural course of the user's interaction with a voice-based application on their device. For example, an authorized user's voiceprint may be dynamically updated as they use a VoIP application, an audio note taker, etc. Such an embodiment allows the voiceprint to be reflective of the authorized user's most up-to-date vocal characteristics. In an embodiment, the voiceprint may be updated after each utilization of a voice-based application or, alternatively, may be updated with detected characteristics at predetermined intervals (e.g., at the end of every week, after a predetermined amount of interactions with a particular application, etc.).

In another embodiment, an image capture device (e.g., an image or video-taking camera, etc.) may be utilized to ascertain that voice inputs captured and provided to the authorized user's voiceprint are produced from the authorized user. For instance, an embodiment may capture an image (e.g., a static or dynamic image, etc.) of a user when an embodiment detects that audible input is being received at the audio capture device. An embodiment may then determine whether the user in the captured image is the authorized user (e.g., by comparing facial characteristics of the user to known facial characteristics of the authorized user, etc.). Additionally or alternatively, an embodiment may identify whether visual aspects of the image correspond to an audio aspect of the audible input. For example, an embodiment may determine whether the individual in the image is moving their mouth in a word-producing fashion during the period of time when audio input is being detected.

In another embodiment, the determination may be conducted by identifying a sound type of the audible input. More particularly, as a non-limiting example, an embodiment may access a database comprising a plurality of sound signatures associated with various sound-producing sources (e.g., non-human objects such as ringing phones, alarms, fan sounds, door closures, etc.). An embodiment may then determine whether the audible input shares a predetermined level of similarity with one or more of the sound signatures in the database. Responsive to determining that the audible input is similar enough to at least one of the sound signatures, an embodiment may conclude that the audible input is background noise that is not produced by the authorized user.

Responsive to determining, at 302, that the audible input is associated with the authorized user, an embodiment may, at 303, utilize the audible input in some downstream function (e.g., transmit the audible input to other participants in a conferencing application, etc.). Conversely, responsive to determining, at 302, that the audible input is not associated with the authorized user, an embodiment may, at 304, perform a silencing action associated with the audio capture device. In an embodiment, there may be a delay in transmission of the captured audible input until the determination is made at 302. More particularly, as an example, audible input may be detected by the audio capture device but may not be transmitted to a desired voice based application until a determination is made regarding whether the audible input is provided by the authorized user or whether the audible input is background noise.

In an embodiment, the silencing action may be a notification (e.g., an audible notification, a visual notification, a combination thereof, etc.) that is provided to the authorized user informing them that background noise is being detected. Additionally or alternatively, the notification may comprise a suggestion for the user to mute the audio capture device during the duration of the background noise or to move, if possible, to a quieter location. In another embodiment, the silencing action may be an automatic muting of the audio capture device. In this embodiment, the muting may be done by the device and may not require any additional user input. For example, one or more conventional digital signal processing techniques may be utilized to remove all of the audio/noise that is identified as not being associated with the authorized user. Additionally, the audio capture device may remain muted for a particular period of time (e.g., during the duration of the background noise, for a predetermined interval of time, etc.) or, alternatively, may be muted until the authorized user manually unmutes the audio capture device.

The various embodiments described herein thus represent a technical improvement to conventional methods for dealing with background noise. Using the techniques described herein, an embodiment may detect audible input using an audio capture device. An embodiment may then determine whether the audible input is provided by an authorized user (e.g., using one or more of the aforementioned determination techniques, etc.) and, responsive to determining that the audible input was not provided by the authorized user, an embodiment may thereafter perform a silencing action associated with the audio capture device (e.g., a muting action, etc.). Such a method may improve the overall quality of audio input interactions between a user and their device, particularly conference calls where beamforming technology, or other types of high-quality background sound elimination technology, is not being utilized.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, R F, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method to reduce the presence of identified background noise, comprising:
    detecting, using an audio capture device associated with an information handling device, audible input;
    determining, using a processor, whether the audible input is associated with an authorized user or is associated with a noise produced by another source, wherein the determining comprises:
    capturing, using an image capture device associated with the information handling device and during detection of the audible input, at least one image;
    ascertaining, using the at least one image and by comparison to a database of authorized users, whether the authorized user is present in the at least one image;
    identifying, responsive to ascertaining that the authorized user is present in the at least one image, whether a visual aspect of the at least one image corresponds to an audio-providing context;
    determining that the detected audible input is not provided by the authorized user responsive to identifying that the visual aspect of the at least one image does not correspond to the audio-providing context; and
    performing, responsive to determining that the audible input is not associated with the authorized user but instead is associated with the noise produced by another source, a silencing action associated with the audio capture device to prevent transmission of the noise produced by another source.

2. The method of claim 1, wherein the determining comprises:
    accessing a database comprising a voiceprint associated with the authorized user; and
    determining whether the audible input shares a predetermined level of similarity with the voiceprint.

3. The method of claim 2, further comprising training the voiceprint with voice input provided to a voice-based application.

4. The method of claim 3, wherein the training comprises:
    capturing at least one characteristic of the voice input; and
    updating the voiceprint with the at least one characteristic.

5. The method of claim 1, wherein the determining comprises:
    accessing a database comprising a plurality of sound signatures associated with at least one non-human sound source; and
    determining whether the audible input shares a predetermined level of similarity with at least one sound signature in the plurality of sound signatures.

6. The method of claim 1, wherein the performing the silencing action comprises providing a notification to the authorized user.

7. The method of claim 6, wherein the notification comprises a suggestion to mute the audio capture device.

8. The method of claim 1, wherein the performing the silencing action comprises automatically muting the audio capture device.

9. An information handling device for reducing the presence of identified background noise, comprising:
    an audio capture device;
    a processor;
    a memory device that stores instructions executable by the processor to:
    detect audible input;
    determine whether the audible input is associated with an authorized user or is associated with a noise produced by another source, wherein the instructions executable by the processor to determine comprise instructions executable by the processor to:

capture, using an image capture device associated with the information handling device and during detection of the audible input, at least one image;

ascertain, using the at least one image and by comparison to a database of authorized users, whether the authorized user is present in the at least one image;

identify, responsive to ascertaining that the authorized user is present in the at least one image, whether a visual aspect of the at least one image corresponds to an audio-providing context;

determine that the detected audible input is not provided by the authorized user responsive to identifying that the visual aspect of the at least one image does not correspond to the audio-providing context; and perform, responsive to determining that the audible input is not associated with the authorized user but instead is associated with the noise produced by another source, a silencing action associated with the audio capture device to prevent transmission of the noise produced by another source.

10. The information handling device of claim 9, wherein the instructions executable by the processor to determine comprise instructions executable by the processor to:

access a database comprising a voiceprint associated with the authorized user; and determine whether the audible input shares a predetermined level of similarity with the voiceprint.

11. The information handling device of claim 10, wherein the instructions are further executable by the processor to train the voiceprint with voice input provided to a voice-based application.

12. The information handling device of claim 11, wherein the instructions executable by the processor to train comprise instructions executable by the processor to:

capture at least one characteristic of the voice input; and update the voiceprint with the at least one characteristic.

13. The information handling device of claim 9, wherein the instructions executable by the processor to determine comprise instructions executable by the processor to:

access a database comprising a plurality of sound signatures associated with at least one non-human sound source; and determine whether the audible input shares a predetermined level of similarity with at least one sound signature in the plurality of sound signatures.

14. The information handling device of claim 9, wherein the instructions executable by the processor to perform the silencing action comprise instructions executable by the processor to provide a notification to the authorized user.

15. The information handling device of claim 9, wherein the instructions executable by the processor to perform the silencing action comprise instructions executable by the processor to automatically mute the audio capture device.

16. A product for reducing the presence of identified background noise comprising a storage device that stores code that when executed by a processor causes the processor to:

detect an audible input via an audio capture device;

determine whether the audible input is associated with an authorized user or is associated with a noise produced by another source, capture, during detection of the audible input, at least one image;

ascertain, using the at least one image and by comparison to a database of authorized users, whether the authorized user is present in the at least one image;

identify, responsive to ascertaining that the authorized user is present in the at least one image, whether a visual aspect of the at least one image corresponds to an audio-providing context;

determine that the detected audible input is not provided by the authorized user responsive to identifying that the visual aspect of the at least one image does not correspond to the audio-providing context; and performing, responsive to determining that the audible input is not associated with the authorized user but instead is associated with the noise produced by another source, a silencing action associated with the audio capture device to prevent transmission of the noise produced by another source.

* * * * *